Feb. 26, 1957 — B. SASSEN ET AL — 2,782,651
HYDRAULIC JOGGER
Filed April 22, 1953 — 3 Sheets-Sheet 3

INVENTORS
BERNARD SASSEN
NAGLE V. GUSCHING
BY Woodling and Krost, Attys.

United States Patent Office 2,782,651
Patented Feb. 26, 1957

2,782,651
HYDRAULIC JOGGER

Bernard Sassen, Torrington, Conn., and Nagle V. Gusching, Sidney, Ohio, assignors to The Monarch Machine Tool Company, a corporation of Ohio Application April 22, 1953, Serial No. 350,354

17 Claims. (Cl. 74—364)

This invention relates in general to a hydraulically actuated geared transmission and more particularly for transmissions in a lathehead stock wherein the gears are shifted by hydraulic power and a jog mechanism is provided to aid the shifting process. This application is a continuation-in-part of application Serial No. 226,074 filed May 12, 1951, for "Hydraulic Jog System."

The gear shifting mechanism in the transmission is hydraulically operated by cylinder type servomotors and a jog mechanism is provided which gives pulsating or non-uniform motion to the gear mechanism to aid in the shifting process. As two gears are attempted to be meshed, there is a possibility for them to be jammed with the flat edges of the teeth coming in contact and preventing the gear teeth from sliding together in proper meshed relationship. The non-uniform motion of the jog mechanism helps to break loose this jammed condition. The jog mechanism shown herein is a hydraulic from of multivibrator.

This jog mechanism is used to provide a manual jog such as a lathe operator would desire during tool set-up conditions. Further, this same jog mechanism is automatically placed in operation in order to aid in the shifting of gears. Thus this jog mechanism serves a dual function. The automatically provided jog mechanism is placed in operation when one of the gears begins its sliding movement for this gear actuates a detent valve to reduce the pressure in a hydraulic circuit to zero and this reduction of pressure acts through a jog control valve to initiate the movement of the jog mechanism.

It is therefore an object of the invention to provide a jog mechanism which has movable members therein and one of the members is a power element that is selectively connected to the gear train to jog the gear train.

Still another object of the invention is to provide a control circuit which includes first and second hydraulic circuits and wherein the first hydraulic circuit provides the fluid pressure to shift a gear transmission to new speed and wherein when such shifting operation commences, the second hydraulic circuit is caused to have a reduced fluid pressure therein to thus control a jog control valve, which in turn initiates the pulsating movement of a jog mechanism to aid in the shifting of the gears and the transmission.

Another object of the invention is to provide a first hydraulic circuit for effecting the shifting of gears, and a second hydraulic circuit for controlling the operation of a jog mechanism which is placed in operation during shifting of gears by a drop of fluid pressure in the second hydraulic circuit.

Still another object of the invention is to provide a hydraulic jog mechanism which incorporates two valves having axially sliding spools wherein one spool is caused to lead and the other to lag in reciprocation so that the reciprocation of one of the spools will actuate a free wheeling clutch mechanism for a pulsating movement of the input of the geared transmission.

Other objects and a fuller understanding of this invention may be had by referring to the following description and claims, taken in conjunction with the accompanying drawings, in which:

Figure 1:
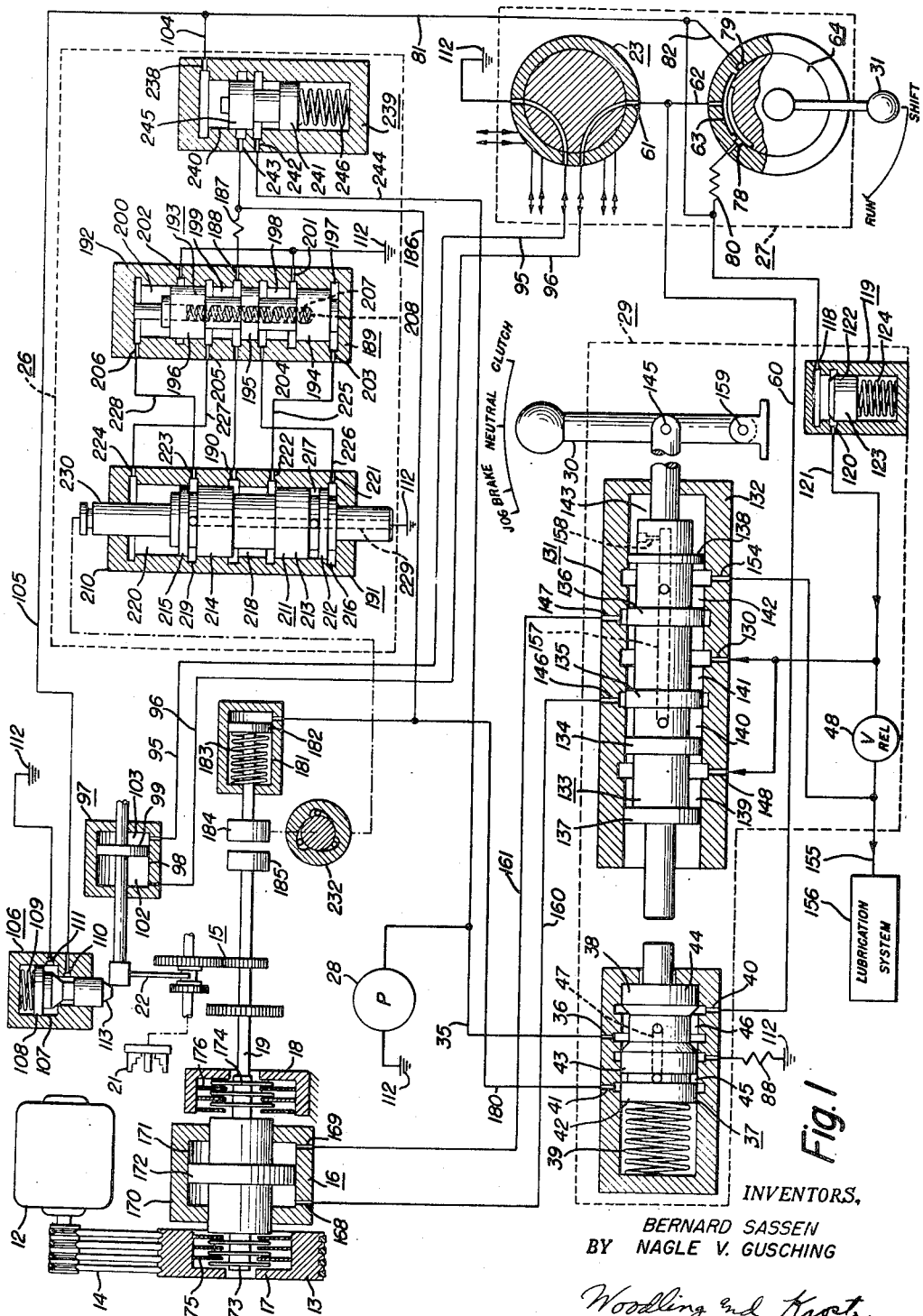
Figure 1 is a schematic hydraulic circuit for controlling the shifting of gears in a transmission.

The Figure 1 shows the general arrangement of the entire gear transmission and shifting mechanism and includes an electric motor 12 which drives a pulley 13 through a belt drive 14. A plural speed gear transmission 15 is adapted to be driven from the pulley 13 through a friction mechanism 16. The friction mechanism 16 includes a clutch 17 and a brake 18. The gear transmission 15 has an input shaft 19 connected to the friction mechanism 16. The transmission has an output through gears not shown, to a lathe spindle 21. The gear transmission 15 in the device actually built is a 36 speed transmission and these 36 speeds are provided by four shifter yokes. Only one shifter yoke 22 is shown in Figure 1. Two of the shifter yokes have three positions and the other two shifter yokes have two positions for a total of 36 combinations to give the 36 different speeds. A speed selector valve 23 has eight conduits connected to hydraulic motors within the gear transmission 15 which provide the power for the shifting of gears. These eight conduits supply fluid under pressure to or from the four fluid motors.

The complete hydraulic circuit used in the hydraulic headstock includes a jog mechanism 26 connected to the input shaft 19 of the transmission 15, a shift control mechanism 27 and a drive control mechanism 29. The shift control mechanism 27 includes the speed selector valve 23, operated from fluid pressure from a pump 28 and includes a shift control lever 31 having run and shift positions. The pump 28 also supplies fluid under pressure to the drive control mechanism 29. The drive control mechanism 29 includes a drive control lever 30 which has four positions; namely, clutch, neutral, brake, and jog. The drive control mechanism 29 includes an inlet conduit 35 from the pump 28. The inlet conduit 35 goes to an inlet port 36 in a jog valve 37. The jog valve 37 has an axially slidable valve spool 38 which is urged to the right by a spring 39. The valve 37 has a first outlet 40, a second outlet 41, and a restricted outlet 88. The spool 38 has first, second, and third lands 42, 43, and 44. These lands provide first and second chambers 45 and 46. The lands 43 and 44 which define the second chamber 46 have sloping or conical surfaces adjacent the outlets 40 and 88. These conical surfaces thus give a better regulation to the flow of hydraulic fluid between the inlet port 36 and these two outlet ports as the spool 38 is axially moved. The spool 38 has an internal passageway 47 between the first and second chambers 45 and 46. The spring 39 normally urges the spool 38 toward the right so that the second outlet 41 is closed off and the first outlet 40 is in communication with the inlet 36.

A conduit 60 interconnects the outlet 40 with an inlet 61 of the speed selector valve 23. A branch conduit 62 also is connected to the conduit 60 and supplies fluid to an inlet 63 of a shift control valve 64. The shift control valve 64 is operated by the shift control lever 31. The shift control valve 64 is shown with the lever in the shift position.

The shift control valve 64 has first and second outlets 78 and 79, respectively. The first outlet 78 is connected to a restricted orifice 80 and then to a conduit 81. The second outlet 79 is connected by a branch conduit 82 to the conduit 81.

The speed selector valve 23 has the inlet 61 and has eight outlet conduits. Two of these outlet conduits have been numbered with reference characters 95 and 96. These conduits 95 and 96 are connected to a shifter motor 97. The shifter motor 97 includes a cylinder 98 and a piston 99. The piston 99 divides the cylinder 98 into first and second chambers 102 and 103, respectively. The piston 99 moves the shifter yoke 22 which in turn moves one or more gears within the gear transmission 15 to effect the changes of speed. It will be understood that the other three pairs of conduits from the speed selector valve 23 also go to shifter motors to effect the changes of speed.

The conduit 81 supplies fluid to a conduit 104 leading into the jog mechanism 26 and supplies fluid to a conduit 105 leading to a detent valve 106. The detent valve 106 includes a cylinder 107 and a piston 108 therein. The upper portion of the cylinder 107 carries a spring 109 which urges the piston 108 downwardly to close off communication between an inlet 110 and an outlet 111. The inlet 110 is connected to the conduit 105 and the outlet 111 is connected to the sump 112 of the pump 28. The detent valve 106 has a plunger 113 connected to the piston 108 and is adapted to be actuated upwardly by movement of the shifter yoke 22. Whenever the shifter yoke 22 is in one of its two or three positions of gear engagement, then the plunger 113 is not lifted, and the valve is closed. This will mean that the fluid passageway between the inlet 110 and outlet 111 is closed off to build up a fluid pressure in the conduit 81.

The conduit 81 next goes to the drive control mechanism 29, and therein it goes to the inlet 118 of a series valve 119. The outlet 120 of this valve is connected to a conduit 121. The series valve 119 includes a cylinder 122 and a piston 123. A spring 124 pushes the piston 123 upwardly attempting to close off the fluid passageway between the inlet 118 and the outlet 120. The upper portion of the piston 123 has a conical surface to establish a more gradual control of the closing off of the fluid passageway. This series valve is in the form of a pressure regulator valve, and the spring 124 is a 100 p. s. i. spring. The term 100 p. s. i. is used to designate a spring which will exert a force on the piston such that a pressure of 100 p. s. i. in the chamber above the piston is required to balance this force.

The conduit 121 supplies fluid under pressure to the inlet 130 of a drive control valve 131. This drive control valve 131 has a valve body 132 and an axially reciprocable valve spool 133 therein. The valve spool 133 has lands 134, 135, 136, 137, and 138. These lands form with the valve body 132 five chambers 139, 140, 141, 142, and 143. The valve spool 133 is connected to a drive control lever 30 by a pivot connection 145, and the lever is pivoted at 159. Thus, the lever 30 is able to control the axial position of the valve spool 133. First and second outlets 146 and 147 are provided in the valve body 132. A second inlet 148 is provided into the chamber 139 in parallel with the inlet 130. A main outlet 154 is provided in the valve body 132 and normally is in communication with the chamber 142. The outlet 154 is connected to an outlet conduit 155 which supplies fluid under a low pressure to a sump or the lubrication requirements of the lathe shown at 156. An outlet passageway 157 is generally axial relative to the valve spool 133 and connects the chambers 140 and 142. A restricted orifice 158 connects the outlet passageway 157 and the chamber 143. The outlets 146 and 147 are connected to conduits 160 and 161. A relief valve 48 is also connected between the conduit 121 and outlet conduit 155.

The conduits 160 and 161 are connected to fluid openings 168 and 169 in the friction mechanism 16. This friction mechanism 16 includes a hydraulic servomotor 170 which is shown as a cylinder 171 and a piston 172 therein. The fluid openings 168 and 169 go to opposite sides of this piston 172. The piston 172 is operatively connected to the input shaft 19 of the gear transmission 15. Connected to the shaft 19 are rotary clutch disks 173 and rotary brake disks 174. The rotary clutch disks 173 are designed to frictionally engage clutch disks 175 driven by the pulley 13. The rotary brake disks 174 are adapted to frictionally engage brake disks 176 which are carried by a stationary part of the frame of the lathe. The friction mechanism 16 is shown in the neutral postion with the piston 172 centered in the cylinder 171. If fluid flows into the opening 169, then the piston 172 will be moved toward the left and hence the clutch disks 173 and 175 will be frictionally engaged so that the motor 12 will drive the input shaft 19 of the transmission 15. If fluid is admitted to the opening 168, then the piston 172 will be moved to the right and hence the input shaft 19 will be braked because of the action of the brake disks 174 and 176.

A conduit 180 leads from the second outlet 41 of the jog valve 37. This conduit 180 supplies fluid under pressure to a cylinder 181. The cylinder 181 carries a piston 182 which is moved to the left by the action of the fluid from the conduit 180 against the urging of a spring 183. This spring is a 50 p. s. i. spring in the lathe headstock as constructed. The leftward movement of the piston 182 carries with it a clutch disk 184 for engagement with a corresponding clutch disk 185. The clutch disk 185 is operatively connected to the input shaft 19 of the gear transmission 15.

The conduit 180 is connected to a branch conduit 186 which supplies fluid under pressure to the jog mechanism 26. The fluid entering the jog mechanism 26 from the branch conduit 186 is for a manual jog operation and this fluid enters a restricted orifice 187 and then passes to the inlet 188 of a first jog valve 189. The restricted orifice 187 also supplies fluid to the inlet 190 of a second jog valve 191. The second jog valve 191 is both a valve and a reciprocating motor. The first jog valve 189 includes a valve body 192 and a spool 193 therein. The spool 193 has first, second, and third lands 194, 195, and 196, respectively. These lands form with the body 192 first, second, third, and fourth chambers 197, 198, 199, and 200, respectively. The body 192 has first and second outlets 201 and 202 which are connected to the sump 112. The body 192 further has four additional fluid openings 203, 204, 205, and 206, respectively. The valve spool 193 has a central aperture 207 which contains a spring 208. This spring urges the spool 193 downwardly.

The second jog valve 191 has a valve body 210 which contains a valve spool 211. The valve spool 211 has first, second, third, and fourth lands 212, 213, 214, and 215, respectively. These lands form with the valve body 210 first, second, third, fourth and fifth chambers 216, 217, 218, 219, and 220, respectively. The valve body 210 has four fluid openings 221, 222, 223, and 224, respectively. A conduit 225 interconnects the fluid openings 222 and 203. A conduit 226 interconnects the fluid openings 221 and 204. A conduit 227 interconnects the fluid openings 224 and 205. A conduit 228 interconnects the fluid openings 223 and 206.

The valve spool 211 contains a waste passageway 229 centrally disposed therein which connects the second and fourth chambers 217 and 219 to the sump 112. The valve spool 211 has an upper portion 230 extending outside the valve body 210. This upper portion 230 is connected by a one way drive or free wheeling mechanism 232 to the clutch disk 184 to rotate this clutch disk.

An automatic jog feature is provided by the control effected by the fluid entering the jog mechanism 26 from the conduit 104. This conduit 104 is connected to an inlet 238 of a jog control valve 239. This valve has a cylinder 240 containing a piston 241. The cylinder 240 has an inlet 242 and an outlet 243. The inlet 242 is connected by a conduit 244 to the output of the pump 28. The piston 241 carries a land 245 which will block off the outlet 243 when control fluid (entering the inlet 238 from the conduit 104) overcomes the 50 p. s. i. spring 246 and forces the piston 241 to its downward position, which is as shown in Figure 1.

*Operation*

The hydraulic headstock shown in the Figure 1 effects a change of gear ratios in the transmission 15 in a minimum of time; which in the worst possible shift combination is only about two seconds. In order to obtain a new speed condition of the spindle 21, the lathe operator will move the drive control lever 30 into the neutral position in which it is shown in Figure 1. Further, the shift control lever 31 must be moved into the shift position as shown. With the pump 28 being driven from some prime mover, not shown, the hydraulic fluid will travel through the conduit 35 to the jog valve 37 to the conduit 60. The jog valve 37 will be in the position shown, that is, urged to the right by the spring 39, and hence will offer no restriction to the flow of fluid between the inlet 36 and the outlet 40. The fluid will continue on to the inlet conduit 61 to go through the speed selector valve 23 as soon as this valve is changed to a new position. Fuid will flow through the conduit 62 to the inlet 63 of the shift control valve 64. From here it will enter the outlet 78 and go through the restricted orifice 80 to the conduit 81. Because the fluid must go through the orifice 80, there is a high pressure built up in the conduit 62 which is used for shifting purposes in the shifter motors 97. The fluid pressure in this conduit 62 is in the order of 1200 p. s. i. The speed selector valve 23 may next be moved to connect a different pair of conduits to the inlet conduit 61 and sump 112. This will mean that one or more of the shifter motors 97 is brought into operation and hence move the corresponding shifter yokes 22.

The shifter yokes all have a plurality of gear engaged positions and when such yokes are in the gear engaged positions, the detent valves 106 will all be closed off. Upon movement of any of the shifter yokes 22, one of the plungers 113 will be depressed to open the associated detent valve 106. This will bleed pressure from the conduit 105 to the sump, and hence the pressure in the conduits 81 and 82 will drop to practically zero.

When the shifting of gears to the new geared speed condition is completed, all shifter yokes 22 will be in one of their gear engaged positions, and hence all of the detent valves 106 will again be closed. This will raise the pressure in the conduits 105, 81, and 82. The shift control valve may then be returned to the run position. Fluid will now flow from the inlet 63 to the outlet 79 and around through the conduits 82 and 81 to the series valve 119. As this pressure builds up to 100 p. s. i., this pressure regulator type of series valve will open to permit the hydraulic fluid to flow to the conduit 121. Fluid will now enter the drive control valve at the inlet 130.

The operator is next ready to drive the spindle at the new speed condition. He does this by means of the drive control lever 30. As this lever is moved toward the clutch position, the valve spool 133 will be moved toward the right. This will permit fluid to flow from the inlet 130 to the outlet 147 and hence through the conduit 161 to the fluid opening 169. Fluid pressure on the right side of the piston 172 will urge this piston to the left to engage the clutch disks 173 and 175. Since the motor 12 is assumed to be running, the torque from this motor will be passed to the input shaft 19 of the gear transmission 15. During movement of the piston 172, fluid from the left side of this piston will exit through the conduit 160 to the outlet 146 of the drive control valve 131. From here, it will pass through the outlet passageway 157 to the main outlet 154. It will then go through the outlet conduit 155 to the lubrication system 156 of the lathe.

If the drive control lever 30 is moved from the neutral position to the brake position, then the valve spool 133 will be moved to the left. This will cause fluid to be directed from the inlet 130 to the outlet 146, the conduit 160, and the fluid opening 168. This will cause the piston 172 to move to the right and hence the brake disks 174 and 176 will be engaged so that the input shaft 19 is braked to a stop. Fluid from the right side of the piston 172 exits through the conduit 161, the outlet 147, the main outlet 154, and the outlet conduit 155.

For the last portion of movement of the spool 133 toward the brake position, the land 138 will cut off the flow of fluid to the main outlet 154. This small amount of fluid will then pass through the outlet passageway 157 and the restricted orifice 158 to reach this main outlet 154. When the lever 30 is in the brake position, the left end of the valve spool 133 will be in contact with the right end of the valve spool 38 of the jog valve 37. If the lever 30 is moved still further to the left toward the jog position, this will cause movement of the valve spool 38. This movement will cause the land 42 to uncover the second outlet 41, and hence fluid from the conduit 35 will be admitted through the internal passageway 47 to the conduit 180. The fluid in the conduit 180 will actuate the clutch 184 and clutch 185 and will also actuate the jog mechanism 26. As the valve spool 38 is moved toward the left, the conical portion of the land 44 will increasingly close off the outlet 40. The pressure build-up in conduit 180 could be too large if the land 44 were to completely close the outlet 40. The restricted outlet 88 will be uncovered by the land 43, however, as the valve spool 38 moves to the left. Thus as the normal pressure regulating portion of the system through the conduit 60 is cut off, the secondary outlet 88 will open to give a secondary pressure regulation to keep the pump load within limits.

The flow of fluid through the conduit 180 enters the cylinder 181 and moves the piston 182 to the left against the urging of the spring 183. This causes the clutch disk 184 to frictionally engage the clutch disk 185. Fluid also flows through the conduit 186 to the restricted orifice 187. From this orifice it enters the inlets 188 and 190 of the first and second jog valves 189 and 191. Both the valves 189 and 191 are shown in their downmost position. The spring 208 causes the first valve 189 to be in its down position and this causes the second valve 191 to be in its down position as will be later shown. As fluid pressure from the conduit 186 enters the inlet 190, the chamber 218 will pass the fluid through the conduit 225 to the fluid opening 203. Fluid in the chamber 197 will thus cause the valve spool 193 to rise against the urging of the spring 208. Fluid in the chamber 200 will exit through the conduit 228 and waste passageway 229 to the sump 112. When the land 195 passes the inlet 188, fluid will be directed into the second chamber 198. From this chamber it will pass through the conduit 226 to the first chamber 216 of the second valve 191. Fluid pressure in this chamber 216 will cause the valve spool 211 to rise. Fluid in the chamber 220 will exit through the conduit 227, the chamber 199 and the outlet 202 to the sump 112. As the land 214 uncovers the third fluid opening 223, the fluid from the inlet 190 will be directed to the conduit 228 into the upper chamber 200. Since the valve spool 193 is now in the up position, this fluid pressure in the upper chamber 200 will force this valve spool downwardly. Fluid in the lower chamber 197 will exit through the conduit 225, the chamber 217 and the waste passageway 229. As the land 195 passes the inlet 188, the fluid from this inlet will be directed by the conduit 227 into the upper chamber 220 of the second jog valve 191. Since the valve spool 211 is now in the up position, this fluid pressure in the chamber 220 will cause the valve spool to be forced downwardly. Fluid in the lower chamber 216 will exit through the conduit 226, the chamber 198 and the outlet 201. When this valve spool reaches the down position, the two valves 189 and 191 will be in the same condition as when the jogging operation was initiated. From the aforementioned operation it will be seen that the first jog valve 189 leads and the second jog valve 191 lags in phase relationship in the reciprocation thereof. Such pulsating reciprocation will continue as long as there is pressure in the conduit 186. The upper portion 230 of the valve spool 211 will pulsatingly reciprocate the free wheeling mechanism 232. This will cause a pulsating or intermittent rotation of the clutch disk 184, and since this clutch disk is in frictional engagement with the clutch disk 185, the input shaft 19 of the gear transmission 15 will be intermittently rotated.

The above description describes the operation of the manual jog mechanism. This jog mechanism 26 may also be automatically operated in accordance wth the pressure in the conduit 81, and such is another feature of the invention. Normally there is a pressure of about 110 p. s. i. in the conduits 81, 82, 104, and 105 during the run condition. As has been previously described, whenever one of the shifter yokes 22 is moved from one of the gear engaged positions, a detent valve 106 will be depressed to cause a practically zero pressure in the conduits 104 and 105. Because of this very low pressure, the spring 246 of the control valve 239 will move the piston 241 upwardly. The land 245 will thus uncover the outlet 243, and hence there will be a fluid passageway between the conduit 244 and the restricted orifice 187. The conduit 244 is connected directly to the outlet of the pump 28, and hence this fluid flow will cause operation of the jog mechanism 26 in the same manner as previously described for the manual jog operation. In this case the jog mechanism 26 is operated automatically whenever the shifting operation is taking place. Such automatic jog feature prevents the gears in the gear transmission 15 from hanging up, and hence facilitates the rapid shifting of the gears. The restricted orifice 187 prevents too much fluid entering the jog mechanism 26, otherwise, it might seriously reduce the fluid pressure available at the shifter motors 97.

The series valve 119 establishes 100 p. s. i. in the conduit 81 so that the control valve 239 cannot be opened when the drive control lever 30 is at or near the neutral position and the shift control lever 31 is in the run position.

When the drive control lever 30 is moved to the jog position to provide the manual jog, the valve spool 133 will also be moved still further to the left from the position during the brake condition. When the lever 30 is in the brake position, the land 134 will be just covering the second inlet 148. As this valve spool is moved still further toward the left, that is, toward the jog position, then fluid from the conduit 121 will enter the inlet 148 and go into the outlet passageway 157 to the chamber 142. This will permit fluid under pressure to go into the conduit 161 to the right side of the piston 172. The leakage to the outlet conduit 155 through the restricted orifice 158 will be quite small, hence the pressure on both sides of the piston 172 will be practically equalized, and hence the brake 18 and clutch 17 will be disengaged so that the job mechanism 26 may pulsatingly drive the input shaft 19.

Figure 2:
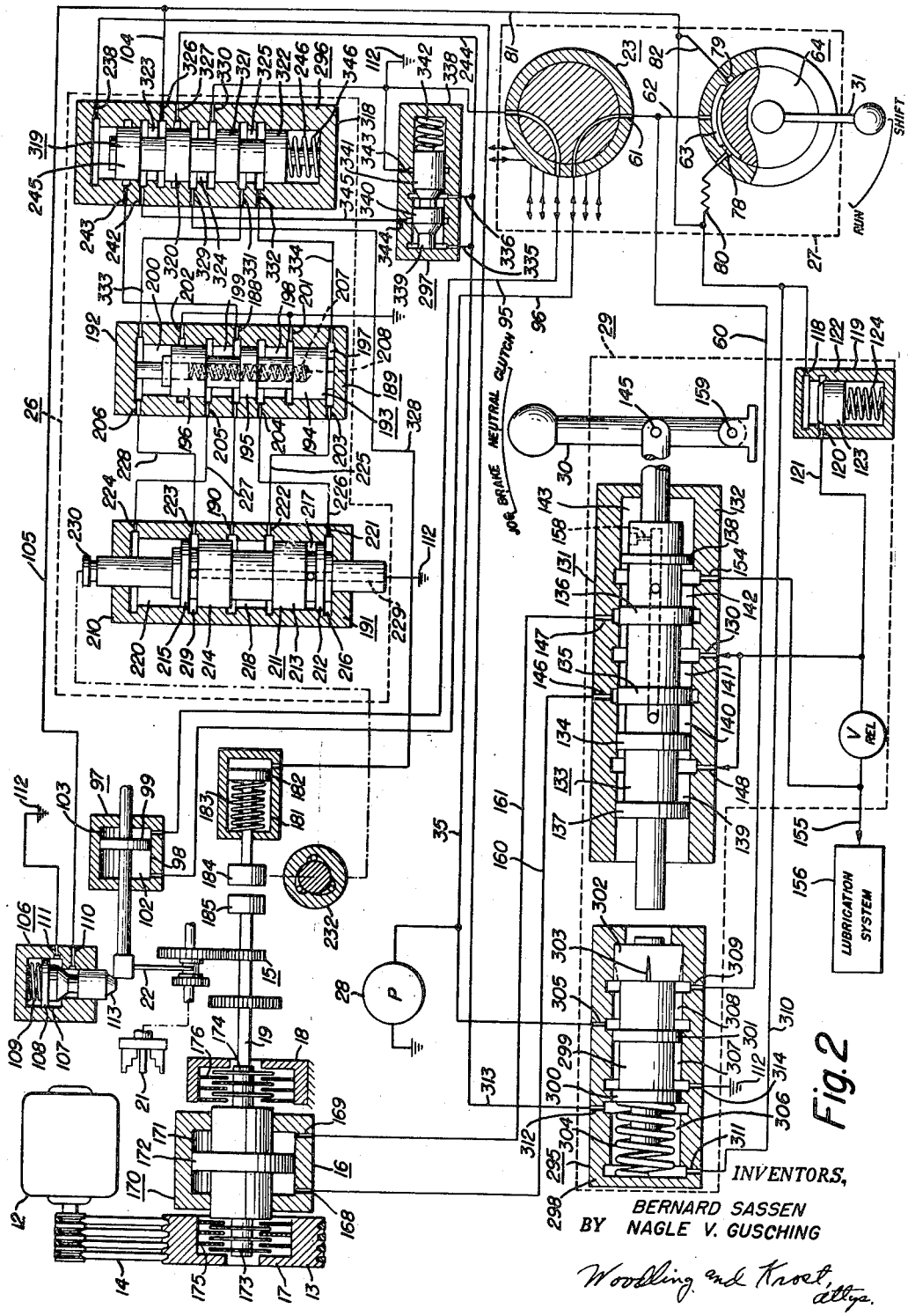
Figure 2 is an improved hydraulic schematic circuit.

The Figure 2 shows an improved hydraulic circuit wherein jog valve 37 has been replaced by a jog valve 295, jog control valve 239 has been replaced with a jog control valve 296, and a pressure regulator valve 297 has been added. In general, the entire hydraulic circuit is quite similar to that shown in Figure 1. The jog valve 295 has a valve body 298 with a valve spool 299 therein. This spool has lands 300, 301 and 302, with the land 302 having triangular grooves 303 therein. These grooves help provide a smoother acting jog valve and provide a more gradual cut-off of the flow of fluid. A spring 304 urges the spool 299 to the right. The lands provide first, second, and third chambers 306, 307, and 308 with the valve body 298. An inlet 305 is connected to the pump conduit 35, and communicates with the third chamber 308. An outlet 309 from the third chamber 308 is connected to the conduit 60. A branch conduit 310 is connected to the conduit 81 and leads to an inlet 311 in the jog valve 295. This inlet 311 communicates with the first chamber 306. An outlet 312 from the first chamber 306 is positioned adjacent the land 300 and a conduit 313 is connected to this outlet. An outlet 314 from the second chamber 307 is connected to the sump 112.

A jog control valve 296 has been expanded to provide more functions and this valve includes a valve body 318 with a valve spool 319 therein. The spring 246 again urges this spool upwardly and the land 245 again blocks off communication between the inlet 242 and the outlet 243. The spool 319 has been provided with additional lands 320, 321, and 322. These lands provide chambers 323, 324, and 325. The conduit 313 is connected to the inlet 238 which is at the upper chamber of this jog control valve 296. The conduit 104 is now connected to an outlet 326 from the chamber 323. The conduit 244 is connected to an inlet 327. This inlet is adapted to communicate with the chamber 324 when the spool 319 is moved upwardly. A conduit 328 interconnects the cylinder 181 and a port 329 in the chamber 324. This chamber 324 is also adapted to communicate with an outlet 330 connected to the sump. Ports 331 and 332 are adapted to communicate with the chamber 325 and these ports are connected by conduits 333 and 334, respectively, to the fluid openings 206 and 203 of the first jog valve 189.

The pressure regulator valve 297 is connected by conduits 335 and 336 to the conduit 244. The valve 297 has a valve body 338 with a valve spool 339 therein. This spool has first and second lands 340 and 341. A 1000 p. s. i. spring 342 urges the spool 339 to the left. The land 341 normally closes off a sump outlet 343 and the land 340 normally closes off an outlet 344. This outlet is connected by a conduit 345 to the inlet 242 of the jog control valve 296.

The jog mechanism 26 in this Figure 2 is further modified by the elimination of the restricted orifice 187 which was present in the jog mechanism of Figure 1. Still further, the restricted orifice 80 in the shift control valve 64 has been made smaller to pass a smaller flow of fluid and thus build up a still higher pressure in the conduit 62.

The operation of the circuit of Figure 2 is improved over that of the circuit of Figure 1. During the run condition of the lathe headstock, that is, when the transmission is transmitting power, the first control lever 31 must necessarily be in the run position. This means that the flow of oil is from the inlet 63 to the second outlet 79 and hence there will be substantially the same pressure in the conduit 81 as in the conduit 62. This pressure would be in the order of 110 p. s. i. To commence the shifting operation, the lathe operator will move the shift control lever 31 to the shift position which will thus direct fluid through the small orifice 80. This will build up a high pressure up to 1000 p. s. i. in the conduit 62 so that high pressure and a high rate of flow of fluid will be available for the shifter motors 97 whenever the speed selector valve 23 is moved to a new position. This pressure is determined by the pressure regulator valve 297, as will be later described. As the shifter yokes 22 move, one or more of the detent valves 106 will be depressed to reduce the pressure to zero in the conduits 81, 82, 104, and 105. This will also drop the pressure to zero in the branch conduit 310 which is in communication with the conduit 313 through the jog valve 295. This will reduce the pressure to zero in the top chamber of the jog control valve 296 and hence the spring 246 will move the spool 319 upwardly. The pressure in the conduit 244 will thus enter through the inlet 327 and go through the port 329 and conduit 328 to actuate the piston 182. This engages the jog clutch disks 184 and 185. Further, the land 322 closes off the port 332 so that there is no short circuit between the chambers 200 and 197 of the first jog valve 189. The shifter motors 97 will require a certain volume of fluid to perform the shifting operation and this fluid is supplied under high pressure so that this shifting operation may be rapidly completed. In approximately one chance out of ten, the gears may "hang up" or "jam" which prevents the completion of the shifting operation. In such event, one or more of the detent valves 106 will still be depressed and hence the jog control valve 296 will be in its up position. If the gears jam, then there is an increased restriction to the flow of oil since the shifter motors are immovable. This will build up a very high pressure in the system which will exceed 1000 p. s. i. and hence the pressure regulator valve 297 will open to pass fluid from the conduit 335 to the conduit 345. This will then supply fluid under this high pressure to the jog valves 189 and 191. The jog mechanism will thus repeatedly jog the gears to relieve the jammed condition. As soon as the jamming of the gears is relieved, the shift motors 97 will again receive fluid and the fluid pressure in the system will drop below 1000 p. s. i. to close the pressure regulator valve 297. This pressure regulator valve has a built-in safety feature in that should the pressure ever get too much above 1000 p. s. i., the spring 342 will be compressed sufficiently so that fluid is bled to the sump through the sump outlet 343. The restricted orifice 187, found in Figure 1, is not needed in this circuit of Figure 2, since the jog mechanism 26 is only called into play when it is actually needed and at such time there is no need to protect the fluid pressure in the rest of the system.

When the shifting operation is completed, all of the detent valves 106 will be restored to their spring urged position which will again raise the pressure in the lines 104 and 105 to the normal condition of about 110 p. s. i. This pressure is then transmitted between conduits 310 and 313 to the spool 319 to move it downwardly against the urging of the spring 246. With the spool 319 moved downwardly, the land 245 cuts off the outlet 243. Further, the land 320 cuts off the inlet 327 and the port 329 is connected to the sump so that the clutch disks 184 and 185 are disengaged. Further, the chamber 325 provides a short circuit by means of the conduits 333 and 334 to the chambers 200 and 197. This short circuit is provided to make sure that the spring 208 will be able to return the spool 193 to the down position. If the short circuit were not provided, and if the spool 211 happened to stop about mid-way in its travel, then both fluid openings 222 and 223 would be closed off which would prevent the spool 193 from going to the downmost position under the urging of this spring 208. This short circuit connection thus makes certain that the first jog valve 189 is always in one of its limiting positions of travel so that the entire jog mechanism is ready for operation.

With the valve spool 319 in its downmost position, the chamber 323 connects the inlet 242 to the outlet 326. With the valve 64 in the shift position, the restricted orifice 80 tends to build up a high pressure in the conduits 35, 60, and 62. If this pressure attempts to exceed 1000 p. s. i., the pressure regulator valve 297 will pass fluid through conduit 345 and chamber 323 to the conduit 81.

The entire system may be used for manual jog as was the system of Figure 1. The jog valve 295 has been changed over that jog valve 37 shown in Figure 1. For the manual jog operation, the drive control lever 30 is moved past the brake position to the jog position. This will move the spool 299 to the left against the urging of the spring 304. This movement causes the land 302 to gradually cut off the outlet 309 so that less oil is passed to the conduit 60 and hence more oil is passed to the conduit 244. As the land 300 uncovers the outlet 312, the conduit 313 will be in communication with the sump outlet 314. This will bleed pressure from the top chamber of the jog control valve 396 and hence the spring 246 will move the spool 319 upwardly so that the inlet 242 is in communication with the outlet 243. When the land 302 covers the outlet 309 sufficiently, a pressure exceeding 1000 p. s. i. will be built up in the conduit 244. This pressure will, of course, actuate the jog clutch disks 184 and 185 through the conduit 328 and will also be passed by the pressure regulator valve 297 so that the jog mechanism 26 operates as described above. When the drive control lever 30 is moved away from the jog position toward the brake position, the spool 299 will be moved to the right by the spring 304 and hence the land 300 will close off communication between the outlet 312 and the sump outlet 314 and will again provide communication between the inlet 311 and the outlet 312. Further, the movement of the land 302 to the right will permit fluid to flow into the conduit 60 and hence reduce the pressure in the conduit 244 below 1000 p. s. i. The pressure regulator valve 297 will thus close to stop the jogging. The pressure in the conduit 310 will be passed to the conduit 313 to thus move the spool 319 downwardly to close off the outlet 243 and the inlet 327.

Figure 3:
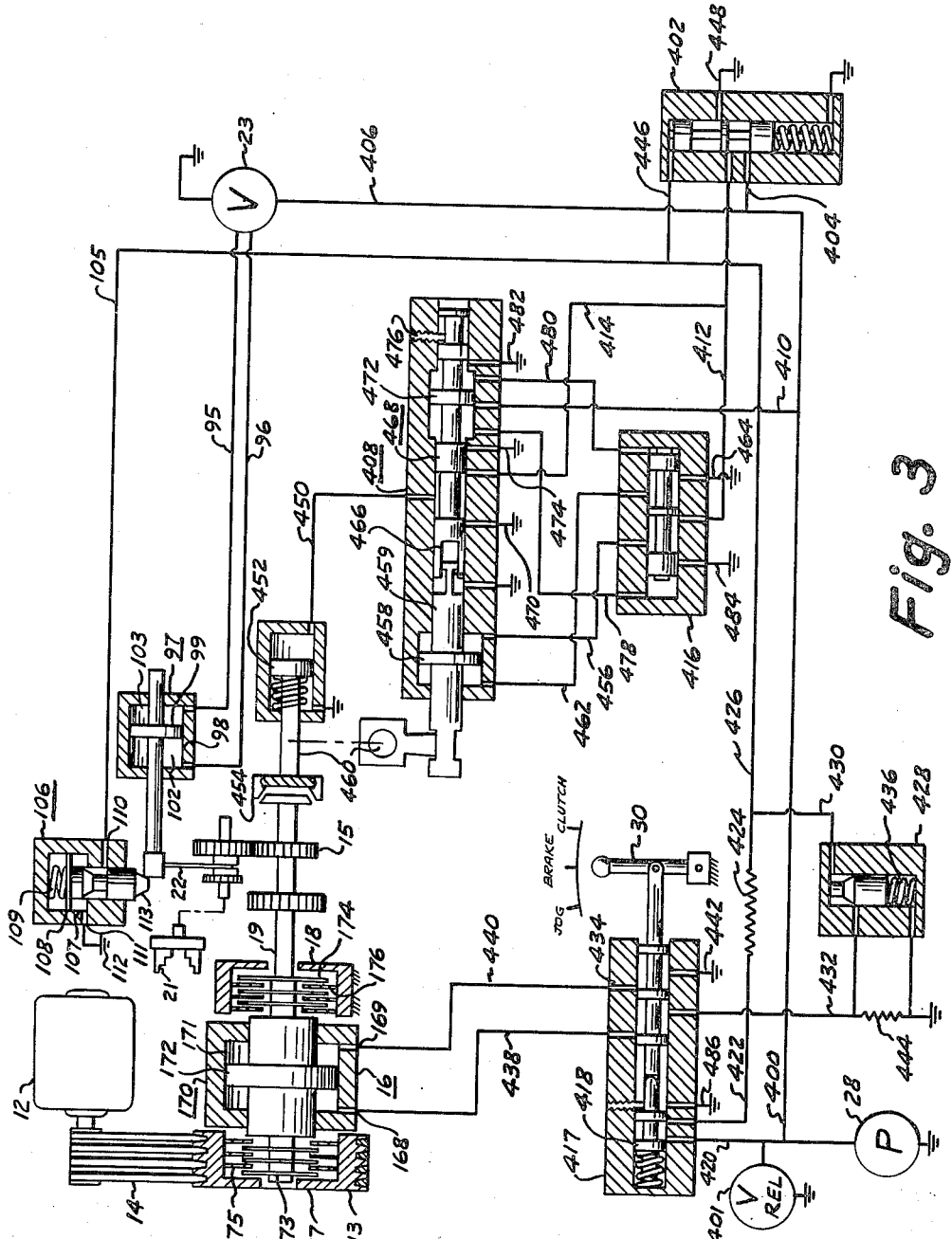
Figure 3 is another schematic hydraulic circuit showing another jog mechanism.

Figure 3 shows another embodiment of a jog mechanism with its associated controlling valves and controlled elements. Most of the elements which are common to the figures carry the same numerology. Motor 12 drives through belts 14, clutch 17, and gears 15 to drive the chuck 21, when handle 30 is in the appropriate position, as is well understood from the prior description.

In this embodiment pump 28 discharges hydraulic fluid into line 400 and the pressure therein is controlled by relief valve 401. Line 400 connects to a jog timing valve 402 by means of line 404 and is connected to the selector valve 23 by means of a line 406 as well as to one end of a jogger or motor 408 by a line 410. The jog timing valve 402, when in the upper position shown, connects line 404 to a line 412 which allows pressure through a line 414 to another inlet of the jogger 408. Line 412 is also connected to a jog pilot valve 416. Line 400 is also connected to a jog valve 417, having a spool 418, by a line 420 and the jog valve spool 418, in the position shown, allows a connection between line 420 and a line 422 when the jog valve spool is not in the manual jog position, as was heretofore described. The line 422 passes hydraulic fluid through a restriction 424 into a line 426. Hydraulic fluid passes from line 426 to a relief valve 428 through a line 430. The relief valve outlet is connected by a line 432 to a brake control valve 434. It is seen that when the pressure in line 426 is above the value of a spring 436 in relief valve 428, the plunger therein is depressed and line 430 is connected to line 432 to provide fluid to the clutch or brake. As shown, fluid passes from line 432 to a line 438 into port 168 thereby urging piston 172 to the right and thus engaging the brake facings 174 and 176. Exhaust flow from volume 171 on the other side of piston 172 passes out a line 440 through the valve 434 and out drain 442. A small leakage to drain is provided by a resistance 444 from line 432. Its purpose will be hereinafter described.

Line 426 is connected by line 105 to the detent valve 106 and is also connected by a line 446 to the top of the jog timing valve 402. It will be seen that when the pump 28 is operating, the line 422 will be discharging fluid through resistance 424 and line 426 will have pressure to communicate to line 446 thereby depressing the spool of the jog timing valve 402 and connecting line 412 to a drain 448. At the same time line 430 will be under pressure to communicate fluid pressure to line 432 and the brake or clutch, as the case may be. Presuming that handle 30 is in the brake position, the selector valve 23 may be moved to select a different gear train. This operation will open detent valve 106 dropping pressure in lines 105, 426, 446, and 430. The relief valve 428 will move to the position shown, cutting off fluid pressure from line 432, and the pressure will leak out of the brake through resistance 444 to drain. The spool of jog timing valve 402 will rise to the position shown and fluid pressure will be supplied to the line 414, through valve 408 to a line 450 where it is connected to a piston 452 which causes engagement of the jog clutch 454. At the same time, line 412 supplies fluid pressure through jog pilot valve 416 to a line 456 which moves a piston 458 in the jogger 408 to the left for a power stroke thereby turning jog shaft 460. The exhaust on the other side of piston 458 passes out of a line 462 through valve 416 to a drain 464.

The jogger 408 contains two elements. One is a plunger 459 carrying piston 458 which is mechanically connected to shaft 460 and which has a lost motion connection 466 connecting it to a valving element 468. It can be seen that as piston 458 nears the end of its power stroke (in a leftward direction) it pulls along the element 468 to the left thereby closing off line 414 from line 450 and connecting line 450 to a drain 470 thereby disengaging clutch 454. Shortly thereafter a valving land 472 passes over the port of line 410, and with a drain 474 also now open, the pressure on the right side of land 472 forces valving element 468 against its stop 476 in the leftward position. At the same time a line 478 also opens to drain 474 and a line 480 is closed off from a drain 482 and is connected to the pressure 410. This action by element 468 moves the spool of jog pilot valve 416 to its leftward position thereby connecting line 412 to line 462 and connecting line 456 to a drain 484.

The piston 458 is now caused to move to the right on an idle stroke with the clutch 454 disengaged. When the plunger 459 nearly reaches the right end of its stroke it moves element 468 to the right until it passes over the port of line 410 and element 468 then moves to the right under its own initiative, and then this element of the valve is in its right-most position. The valve 416 is moved to the position shown by pressure in line 478, and the cycle starts over again.

It is thus seen that when the gears are shifted, jogging automatically starts. When the gear shifting is completed, the detent valve 106 closes and the pressure in line 105 depresses the spool of jog time valve 402 and it opens the relief valve 428 which applies the brake. The clutch may now be engaged by moving the handle 30 to clutch position and the gear train will run at its new ratio.

In some cases it is desirable to move the chuck 21 slowly so that the operator may more easily set up the machine. To assist this the handle 30 is provided with a jog position. When the handle is pushed to this position, the valve spool 418 is moved to the left thereby opening line 422 to a drain at 486 and this pressure drop causes the jog action to operate in the same manner as when a detent is opened.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with two relatively movable and coacting elements subject to jamming interference, the provision of a hydraulic circuit and pulsator mechanism to aid in the movement of one element to eliminate the jamming, comprising, a movement control valve having an inlet for connection to a fluid pressure source, a restricted orifice outlet in said valve, a pulsator control valve having a normally closed fluid passageway, means for connecting said pulsator mechanism through said fluid passageway to a source of fluid pressure to operate said pulsator mechanism, valve means operable by the movement of said element to reduce the pressure at said restricted outlet below a given value, and means responsive to a reduction of fluid pressure at said restricted outlet below said given value to open the fluid passageway in said pulsator control valve.

2. In combination with two relatively movable and coacting elements subject to jamming, the provision of a hydraulic circuit and pulsator mechanism to aid in the movement of one element to relieve said jamming, comprising, a double throw movement control valve having an inlet for connection to a fluid pressure source, a restricted orifice outlet and an unrestricted outlet in said valve, a pulsator control valve having a fluid passageway, means for connecting said pulsator mechanism through said fluid passageway to said fluid pressure source to operate said pulsator mechanism, conduit means interconnecting said outlets, valve means operable by the shifting movement of said element to reduce the pressure in said conduit means below a given value when the movement control valve is positioned for fluid flow through said restricted outlet, means responsive to a reduction of fluid pressure in said conduit means below said given value to open the fluid passageway in said pulsator control valve.

3. In combination with a gear shifting mechanism having a plurality of shiftable gears, the provision of a hydraulic circuit and pulsator mechanism to aid in the shifting of said gears, comprising, a shift control valve, having an inlet for connection to a fluid pressure source, a restricted orifice outlet in said valve, a pulsator control valve having a fluid passageway and a fluid chamber, spring means in said pulsator control valve exerting a force to open said fluid passageway, fluid pressure of a given value in said fluid chamber closing said fluid passageway, conduit means connecting said fluid chamber to said restricted outlet, valve means operable by the shifting movement of said gears to reduce the pressure in said conduit means below said given value, and means for connecting said pulsator mechanism through said fluid passageway to a source of fluid pressure to operate said pulsator mechanism.

4. In combination with two relatively movable and coacting elements subject to jamming, the provision of a first hydraulic circuit connectable to a source of fluid pressure, a movement control valve having an inlet connected to said first hydraulic circuit and having a first restricted orifice outlet and a second unrestricted outlet, a second hydraulic circuit connected to both said first and second outlets, a normally closed detent valve operable by movement of one of said elements to reduce the pressure in said second hydraulic circuit below a given value, a normally open spring urged jog control valve having a fluid passageway, fluid pressure means interconnecting said jog control valve and said second hydraulic circuit, fluid pressure of said given value in said fluid pressure means closing said fluid passageway against the urging of the spring in said jog control valve, a hydraulically controlled jog mechanism having a fluid inlet connected through said fluid passageway in said jog control valve to said first hydraulic circuit, said jog mechanism being connected to one of said movable and coacting elements to cause pulsating movement thereof and hence tend to relieve said jamming, said movement control valve having first and second positions, said first position effecting fluid communication between said inlet and said first outlet, and said second position effecting fluid communication between said inlet and said second outlet, said first position effecting a high fluid pressure in said first hydraulic circuit to aid in controlling said jog mechanism.

5. In a hydraulically operated gear shifting mechanism, a plural speed geared transmission having an input and an output, hydraulic power means including a plural position fluid valve for selecting any one of the geared speeds of said transmission, a shift control valve having an inlet adapted for connection to a pressure fluid source and having a first restricted orifice outlet and a second unrestricted outlet, a hydraulic circuit connected to both said first and second outlets, shifter yokes in said geared transmission to effect the shifting of gears therein under control of said fluid valve, a normally closed detent valve operable by movement of a shifter yoke, an inlet and an outlet for said detent valve, said inlet being connected to said hydraulic circuit and said outlet being connected to waste, a normally open spring urged jog control valve having a fluid passageway, a fluid chamber in said jog control valve connected to said hydraulic circuit, fluid pressure of a given value in said fluid chamber closing said fluid passageway against the urging of the spring in said jog control valve, a hydraulically operable jog mechanism having a fluid inlet connected through said fluid passageway in said jog control valve and adapted to be connected to a pressure fluid source, said jog mechanism being connected to said transmission input to cause pulsating movement thereof, movement of said detent valve to an open position causing the fluid pressure in said hydraulic circuit to drop below said given value to thus cause operation of said jog mechanism and movement of said detent valve to a closed position causing the fluid pressure in said hydraulic circuit to rise above said given value to thus cause cessation of operation of said jog mechanism, said shift control valve having shift and run positions, said shift position effecting fluid communication between said inlet and said first outlet, and said run position effecting fluid communication between said inlet and said second outlet.

6. In a hydraulically operated gear shifting mechanism, a plural speed geared transmission having an input and an output, hydraulic power means including a plural position fluid valve for selecting any one of the geared speeds of said transmission, a first hydraulic circuit interconnecting said valve and said hydraulic power means, a shift control valve having an inlet connected to said first hydraulic circuit and having a first restricted orifice outlet and a second unrestricted outlet, a second hydraulic circuit connected to both said first and second outlets, shifter yokes in said geared transmission to effect the shifting of gears therein by fluid pressure from said first hydraulic circuit under control of said fluid valve, a normally closed detent valve operable by movement of a shifter yoke, an inlet and an outlet for said detent valve, said inlet being connected to said second hydraulic circuit and said outlet being connected to waste, a normally open spring urged jog control valve having a fluid passageway, a fluid chamber in said jog control valve connected to said second hydraulic circuit, fluid pressure of a given value in said fluid chamber closing said fluid passageway against the urging of the spring in said jog control valve, a hydraulically operable jog mechanism having a fluid inlet connected through said fluid passageway in said jog control valve and through a pressure regulating valve to said first hydraulic circuit, fluid pressure exceeding a second given value opening said pressure regulator valve, said jog mechanism being connected to said transmission input to cause pulsating movement thereof, movement of said detent valve to an open position causing the fluid pressure in said second hydraulic circuit to drop below said first given value to thus open said fluid passageway and movement of said detent valve to a closed position causing the fluid pressure in said second hydraulic circuit to rise above said first given value to thus close said fluid passageway, said shift control valve having shift and run positions, said shift position effecting fluid communication between said inlet and said first outlet, and said run position effecting fluid communication between said inlet and said second outlet, said shift position effecting a high fluid pressure in said first hydraulic circuit to aid in shifting said shifter yokes, blocking of movement of any of the shifter yokes to prevent completion of movement thereof establishing a high pressure above said second given value in said hydraulic power means and in said first hydraulic circuit, coincidence of said second given value of pressure in said first hydraulic circuit and pressure in said second hydraulic circuit below said first given value establishing operation of said jog mechanism.

7. In a fluid system, a fluid motor and a valve having body means and first and second movable members co-operating therewith, land means on said first member producing at least first and second chambers with said body means, land means on said second member producing at least third and fourth chambers with said body means, a pressure fluid inlet in said body means into a chamber associated with said first member, said first member having at least two positions directing fluid into said third and fourth chambers, respectively, whereat the exhaust from said fourth and third chambers, respectively, passes intermediate the ends of said first member, said second member having at least two positions directing fluid into said first and second chambers, respectively, each of said members having a pulsating movement, said first member leading the movement of said second member, and means to introduce fluid under pressure to a chamber associated with said second member.

8. In a fluid system, a fluid motor and a valve having body means and first and second movable members co-operating therewith to form a plurality of fluid chambers, each of said members having at least two positions, a plurality of fluid openings co-operating with said fluid chambers, one position of said first member directing fluid to one end of said second member to urge said second member toward one position thereof, the exhaust from the other end of said second member passing through fluid openings intermediate the ends of said first member, said one position of said second member directing fluid to urge said first member toward another position thereof, said another position of said first member directing fluid to urge said second member toward another position thereof, and said another position of said second member directing fluid to urge said first member toward a different position thereof.

9. In a fluid system, a fluid pulsating mechanism and valve having a body and first and second movable members therein, each of said members having first and second alternate positions, land means on each of said members defining a plurality of fluid chambers with said body, a plurality of fluid openings co-operating with said fluid chambers, conduit means interconnecting the chambers associated with one member with the chambers associated with the other member, the first position of said first member directing fluid from a first member chamber to a second member chamber to urge said second member toward said first position thereof, the exhaust from another second member chamber passing said first member intermediate the ends thereof, the first position of said second member directing fluid from a second member chamber to a first member chamber to urge said first member toward said second position thereof, the second position of said first member directing fluid from a first member chamber to a second member chamber to urge said second member toward said second position thereof, and said second position of said second member directing fluid from a second member chamber to a first member chamber to urge said first member toward said first position thereof.

10. A fluid jog mechanism including a valve body and first and second valve members movable therein, first, second, and third lands on said first valve member producing with said body first, second, third, and fourth chambers, twelve fluid openings in said body, said first opening being in communication with said first chamber, said second opening adapted to be in communication with said second chamber, said third opening being in communication with said second chamber, said fourth opening adapted to be in communication with said second and third chambers, said fifth opening being in communication with said third chamber, said sixth opening adapted to be in communication with said third chamber, and said seventh opening being in communication with said fourth chamber, fourth, fifth, sixth, and seventh lands on said second valve member producing with said body fifth, sixth, seventh, eighth, and ninth chambers, said eighth opening being in communication with said fifth chamber, said ninth opening adapted to be in communication with said sixth and seventh chambers, said tenth opening being in communication with said seventh chamber, said eleventh opening adapted to be in communication with said seventh and eighth chambers, and said twelfth opening being in communication with said ninth chamber, said fourth and tenth openings being the pressure fluid inlets for said valve body and said second and sixth openings being connected to waste, said sixth and eighth chambers also being connected to waste, a first conduit interconnecting said first and ninth openings, a second conduit interconnecting said third and eighth openings, a third conduit interconnecting said fifth and twelfth openings, and a fourth conduit interconnecting said seventh and eleventh openings.

11. A hydraulic jog mechanism including first and second valves operable from a pressure fluid source, said first valve having a body and an axially slidable spool therein with first, second, and third lands producing first, second, third, and fourth chambers, said first valve having first, second, third, fourth, fifth, sixth, and seventh fluid openings in said body, said first opening being in communication with said first chamber, said second opening adapted to be in communication with said second chamber, said third opening being in communication with said second chamber, said fourth opening adapted to be in communication with said second and third chambers, said fifth opening being in communication with said third chamber, said sixth opening adapted to be in communication with said third chamber, and said seventh opening being in communication with said fourth chamber, said fourth opening being the pressure fluid inlet and said second and sixth openings being connected to waste, said second valve having a body and an axially slidable spool therein with fourth, fifth, sixth, and seventh lands producing fifth, sixth, seventh, eighth, and ninth chambers, said second valve having eighth, ninth, tenth, eleventh, and twelfth fluid openings in said body, said eighth opening being in communication with said fifth chamber, said ninth opening adapted to be in communication with said sixth and seventh chambers, said tenth opening being in communication with said seventh chamber, said eleventh opening adapted to be in communication with said seventh and eighth chambers, and said twelfth opening being in communication with said ninth chamber, said tenth opening being the pressure fluid inlet for said second valve, said sixth and eighth chambers being connected to waste, a first conduit interconnecting said first and ninth openings, a second conduit interconnecting said third and eighth openings, a third conduit interconnecting said fifth and twelfth openings, a fourth conduit interconnecting said seventh and eleventh openings, a spring urging said first valve spool to one limit of reciprocation, and a free wheeling clutch mechanism operated by the intermittent reciprocation of the spool of said second valve.

12. In combination with two relatively movable and coacting elements subject to jamming interference, the provision of a hydraulic circuit and pulsator mechanism to aid in the movement of one element to eliminate the jamming, comprising, a fluid pressure source connected by a conduit to the pulsator mechanism through a jog control valve, a fluid resistance adapted to be connected to said conduit, a second conduit connected to the other side of said resistance to collect fluid passing through said fluid resistance, valve means connected to said second conduit and operable by movement of said one of said elements to reduce the pressure in said second conduit at said fluid resistance below a given value, said jog control valve being connected to said second conduit and responsive to the reduced pressure in said second conduit to connect said first conduit to said pulsator mechanism.

13. In combination with two relatively movable and coacting elements subject to jamming interference, the provision of a hydraulic circuit and pulsator mechanism to aid in the movement of one element to eliminate the jamming, comprising, a fluid pressure source connected by a conduit to the pulsator mechanism through a jog control valve, a fluid resistance adapted to be connected to said conduit, a second conduit connected to the other side of said resistance to collect fluid passing through said fluid resistance, valve means connected to said second conduit and operable by movement of said one of said elements to reduce the pressure in said second conduit at said fluid resistance below a given value, a manually operable valve also connected in said second conduit to reduce the pressure in said second conduit below said given value when manually operated, said jog control valve being connected to said second conduit and responsive to the reduced pressure in said second conduit to connect said first conduit to said pulsator mechanism.

14. In combination with two relatively movable and coacting elements subject to jamming, the provision of a hydraulic circuit and pulsator mechanism to aid in the movement of one element to relieve said jamming, comprising, a fluid pressure source, a pulsator control valve having a closable fluid passageway, a conduit connected from said fluid pressure source through said passageway to the pulsator mechanism, valve means operable by movement of said one of said elements, a fluid resistance adapted to be connected to said conduit, and a second conduit connected to said pulsator control valve, said valve means and said fluid resistance, whereby movement of said one of said elements opens said valve means and causes the pressure in said second conduit to drop below a certain point and the pressure drop causes the pulsator control valve to open said passageway to said pulsator mechanism.

15. In combination with two relatively movable and coacting elements subject to jamming, the provision of a hydraulic circuit and pulsator mechanism to aid in the movement of one element to relieve said jamming, comprising, a fluid pressure source, a pulsator control valve having a closable fluid passageway, a conduit connected from said fluid pressure source through said passageway to the pulsator mechanism, a pressure responsive clutch means operable to clutch said pulsator mechanism to said element, said clutch being connected by a conduit to said pulsator control valve, valve means operable by movement of said one of said elements, a fluid resistance adapted to be connected to said conduit, and a second conduit connected to said pulsator control valve, said valve means and said fluid resistance, whereby movement of said one of said elements opens said valve means and causes the pressure in said second conduit to drop below a certain point and the pressure drop causes the pulsator control valve to open said passageway to said pulsator mechanism.

16. The structure of claim 15 wherein a manually operable valve is connected in said second conduit to reduce the pressure in said second conduit below said certain point upon manual operation to cause operation of said clutch and pulsator mechanism.

17. In a fluid system, a fluid pulsating mechanism and valve having first and second movable assemblies therein, each of said assemblies having first and second alternate positions, means in each of the assemblies defining a plurality of fluid chambers, a plurality of fluid openings connected to said chambers, valving means in each of the assemblies, conduit means connecting the valving means to said chambers, the first position of said first assembly directing fluid to a second assembly chamber to move said second assembly from a first to a second position, said second assembly in said second position directing fluid to move said first assembly from a first to a second position, said second member chamber exhausting through said first assembly valving intermediate the ends thereof.

References Cited in the file of this patent

UNITED STATES PATENTS

| | | |
|---|---|---|
| 2,307,866 | Slater | Jan. 12, 1943 |
| 2,348,243 | Cole | May 9, 1944 |
| 2,352,212 | Lang et al. | June 27, 1944 |